(12) United States Patent
Ordway

(10) Patent No.: US 6,200,638 B1
(45) Date of Patent: Mar. 13, 2001

(54) SHOCK HARDENED FLOORING

(76) Inventor: William C. Ordway, 109 Westies La., #6, Palm Coast, FL (US) 32164-7753

( * ) Notice: Subject to any disclaimer, the term of this patent is extended or adjusted under 35 U.S.C. 154(b) by 0 days.

(21) Appl. No.: 08/835,771

(22) Filed: Apr. 8, 1997

(51) Int. Cl.$^7$ .................................................. B05D 3/12
(52) U.S. Cl. .................... 427/355; 427/393.6; 427/407.1
(58) Field of Search ............................. 427/393.6, 407.1, 427/355

(56) References Cited

U.S. PATENT DOCUMENTS

| | | | |
|---|---|---|---|
| 4,059,709 | 11/1977 | Conger et al. | 427/264 |
| 4,240,852 | 12/1980 | Gomberg et al. | 156/96 |
| 5,087,661 | 2/1992 | Aoki et al. | 524/714 |
| 5,100,704 | 3/1992 | Iwakura et al. | 427/302 |
| 5,405,674 | 4/1995 | Wang et al. | 428/158 |
| 5,411,352 | 5/1995 | Eren | 404/31 |
| 5,455,293 | 10/1995 | Wood et al. | 524/271 |
| 5,458,953 | 10/1995 | Wang et al. | 428/195 |
| 5,473,043 | 12/1995 | Maki et al. | 528/60 |
| 5,494,707 | 2/1996 | Wang et al. | 427/412.1 |
| 5,693,714 | * 12/1997 | Bauman et al. | 525/104 |

* cited by examiner

*Primary Examiner*—Michael Lusignan

(57) ABSTRACT

Mixture of rubber and urethane binders for stable floor surfaces such as gyms, basketball courts, volleyball courts, pool decks and the like. The rubber and binder are pre-mixed and sealed in a vacuum sealed bucket or bag so that the mixture can be directly applied at a job site without additional mixing. A top coat having an 5 to 1 ratio of dyed rubber and binder forming a ½ thick surface can be used for sidewalks, running tracks and pool decks. A base layer having a 8 to 1 ratio of buffing rubber and binder can be used under the top coat for forming a shock resistant floor. Curing of the mixture on the floor surfaces can be done by adding water, through humidity or by natural rain.

13 Claims, 3 Drawing Sheets

US 6,200,638 B1

SHOCK HARDENED FLOORING

This invention relates to flooring surfaces, and in particular to a method of making a ready made mix of resilient flooring material that requires no mixing on the jobsight to use.

BACKGROUND AND PRIOR ART

Injuries have been known to occur on hard floors such as those found on children's playgrounds, running tracks and pool decks. The damage due to the injuries decreases when the hardened surfaces are padded and cushioned.

Previous processes for applying rubberized flooring has required plural products including chemicals, that must be purchased and delivered to a jobsight where the products must then be mixed in a special manner using special equipment such as mixers and plural laborers to apply the process. Thus, the process can be expensive, time consuming, and result in messy non uniform applications.

Examples of the prior art include U.S. Pat. Nos. 4,059,709 to Conger et al.; 4,240,852 to Gomberg et al.; 5,087,661 to Aoki et al.; 5,100,704 to Iwakura et al.; 5,405,674 to Wang et al.; 5,411,352 to Eren; 5,455,293 to Wood et al.; 5,458,953 to Wang et al.; 5,473,043 to Maki et al.; and 5,494,707 to Wang et al. None of the prior art patents overcome the problems above.

SUMMARY OF THE INVENTION

The first objective of the present invention is to provide a readily applicable resilient floor mixture that can be applied to a floor surface without additional onsite job mixing.

The second objective of the present invention is to provide a readily applicable resilient floor mixture that can be applied by as few as one installer onsite.

The third objective of the present invention is to provide a flooring for playgrounds to absorb the shock force of children playing on the flooring.

A preferred method of making a resilient flooring mixture for producing a shock absorbant floor includes: drying rubber to substantially remove moisture by heating it to approximately 212 F, mixing the dried rubber with a urethane type binder material a mixer, pouring the mixture into a bag or bucket, vacuum removing ambient air and moisture from the container, sealing the container, applying contents of the container to a hardened floor surface, wherein no other materials and components are used to form a shock absorbant resilient floor. The rubber is chosen from rubber granulars, rubber buffings, virgin dyed rubber and virgin black rubber.

A preferred method of applying the ready made mixture to a hard floor surface includes: pouring a pre-mixture of rubber and a binder product onto a stable floor surface, levelling the poured mixture to a selected depth, and curing the levelled mixture with water, natural humidity or rain, wherein no other materials and components are used to form a shock absorbant resilient floor. The pre-mixture of rubber and the binder product can have a top coat layer having a 5 to 1 dyed rubber component to urethane binder ratio and is approximately ½ inch thick. Another version of the pre-mixture of rubber and the binder product can have a top coat having a 5 to 1 dyed rubber to urethane binder ratio of ½ inch thick, and a bottom layer having an 8 to 1 buffing rubber to urethane binder ratio of approximately 1 and ½ inch thick. The mixtures can be used on stable floor surfaces such as gyms, basketball courts, volleyball courts, pool decks and the like. The dyed rubber can be colored to the desired color effect of the surface.

Further objects and advantages of this invention will be apparent from the following detailed description of a presently preferred embodiment which is illustrated schematically in the accompanying drawings.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Figure 1:
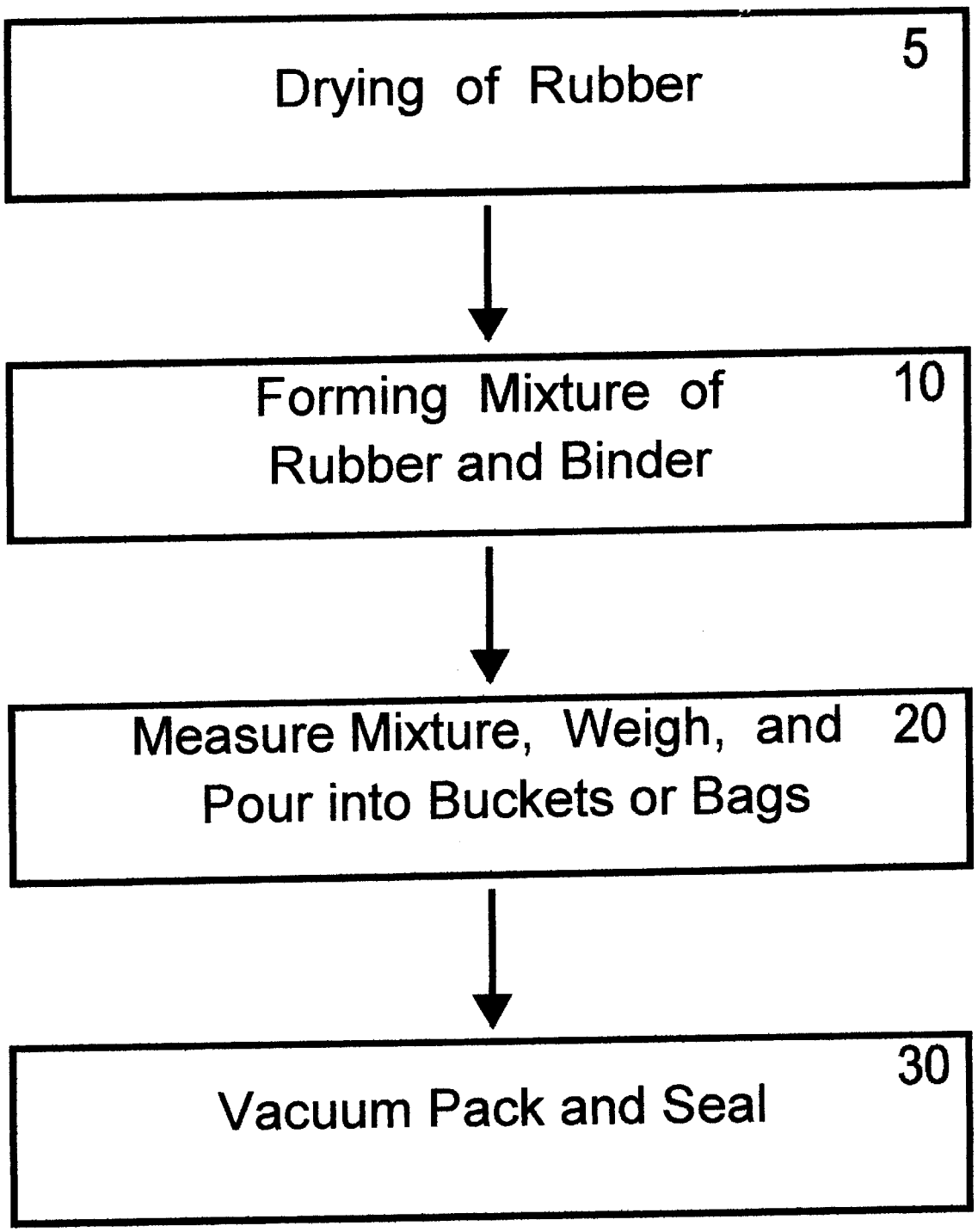
FIG. 1 is a flow chart showing the method of making the novel floor covering mixture of the subject invention.

FIG. 1 is a flow chart 1 showing the method of making the novel floor covering mixture of the subject invention. The rubber material component can include rubber granulars, buffings, and crumbs such as "recycled or dyed virgin rubber." Each of the small rubber material components can be approximately 0.5 millimeters to approximately 5 millimeters in diameter and can be round in shape. The rubber granulars can be those manufactured by Midwest Elastomer Inc. of Wapakoneta, Ohio. Rubber buffings are generally recycled rubber that is ground up or shredded to a strand or chip like appearance. Dyed virgin rubber is a rubber that is dyed in its' raw material stage (i.e. a liquid or paste stage), then made into a hard rubber and then generally granulated such as that manufactured by Midwest Elastomers Inc. of Wapakoneta, Ohio.

For applications rubber buffings are preferred because they are recycled and are far less expensive compared to dyed rubber. For achieving a soft cushion feel, a preferred ratio of rubber to binder can be 8 to 1. If dyed granulars are used there mixture requires a higher binder content for strength and durability of 5 to 1 rubber to binder.

Referring to FIG. 1, the Rubber component needs to be as free from moisture as possible. The urethane binder component needs to be a slow curing material. Rubber and urethane is to be mixed as needed then weighed and poured into buckets to be sealed closed. All this needs to be done in a climate controlled facility (0% humidity if possible).

In step 5, the rubber component is dried to having approximately 0% moisture. The step of drying can include heating the rubber component to over approximately 212 F in oven until drying is completed. In step 10, moisture cured urethane binder such as one manufactured by Futura Coatings Inc. of Hazelwood, Mo., is mixed with the rubber component. Both the rubber component and the binder are mixed thoroughly together in an industrial type mixer such as but not limited to an automated gas powered Mortar Mixer manufactured by Stowes Inc., which holds approximately one and a half 50 lb bags of material at a time. The mixer can be run for approximately 5 to approximately 10 minutes or until a thorough mixture is made.

Referring to step 20, the mixture is poured into a plastic bucket or foil bag where it is vacuum packed at step 30 to remove excess air and moisture. The plastic buckets and vacuum foil bags or Mylar bags can have seals to vacuum out air and moisture. The lids can be plastic with a vacuum seal. A preferred bucket size can hold approximately 1 gallon of the mixture.

Figure 2:
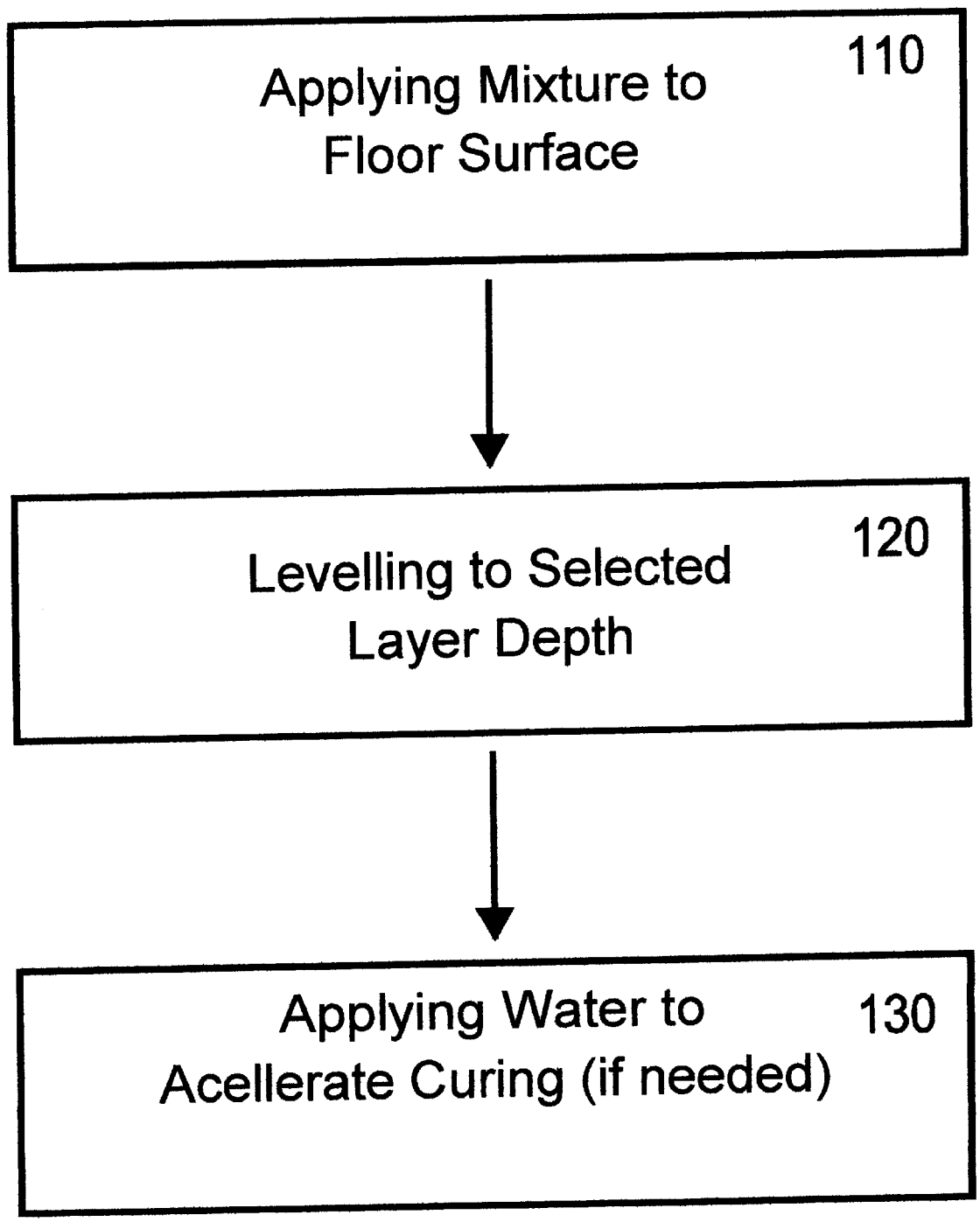
FIG. 2 is a flow chart showing the operation by which the subject invention is applied to a floor surface.

FIG. 2 is a flow chart 100 showing the operation by which the subject invention is applied to a clean floor surface such as an indoor and outdoor playground, gymnasium, health club, exercise room, pool decks(cement, laminated, stained, wood), sidewalks, driveways, running tracks, bike tracks, gymnasium floors, basketball courts, volleyball courts, boat floors and decks. Other stable surfaces include but are not limited to cement, tiled, wood, plastic and the like.

The pre-mixed material is installed by pouring a bucket or bag of mixture onto the floor at step 110. Next at step 120, the mixture is levelled to a selected depth using a rake and or by using the trowel to smooth the surface to its final finish. Diesel fuel, mineral spirits or similar lubricating fluids can be used to lubricate the trowel so as not to stick to the mixture. With a little compression, the mixture is also compacted for its strength and smoothness. At step 130, moisture such as but not limited to an artificial sources such as water spray or natural sources if done outdoors such as rain, humidity, is used to accelerate curing of urethane. No other materials need to be used onsite by workers or laborers installing the novel shock hardened flooring.

The product may also be premixed then poured into molds when needed. Alternatively, compression molds and injection molds can be used to make the molded products. For example, molded products can include but are not limited to speed bumps, playground tiles, interlocking tiles and the like. The compression molds can generally include a container forming the size and shape and depth of the intended product that is to be made. In the container, a lid is compressed to hold pressure on the rubber within the container until it is cured or hard. Then the product is removed from the container mold.

The system primarily used with this product is referred to as the trowelled system. It is installed in most playgrounds under the play equipment which the kids play on or around. Its main purpose is to absorb the shock when kids fall. The invention has great utility on hard durable surfaces activities by people are occurring such as but not limited to surfaces where walking running, bike riding, driving and the like, occur.

Figure 3:
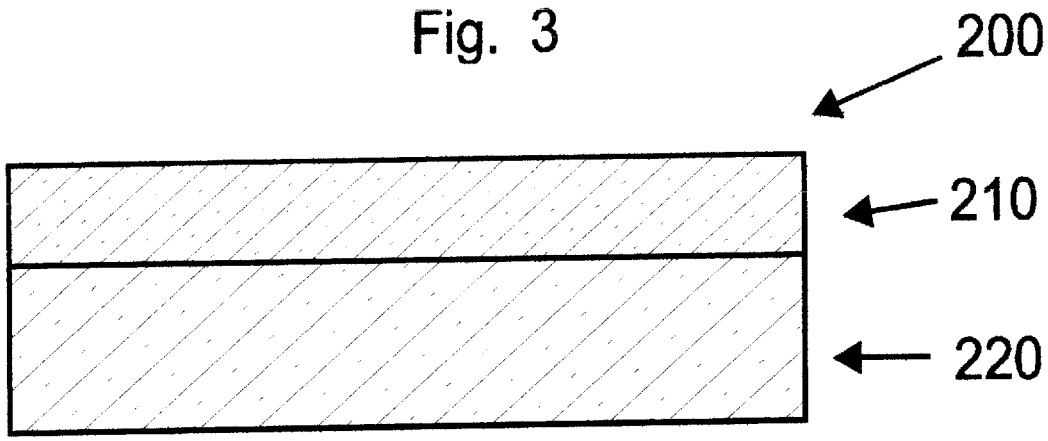
FIG. 3 is a cross-sectional view of a top coat and base coat to floor application of the invention.
Figure 4:
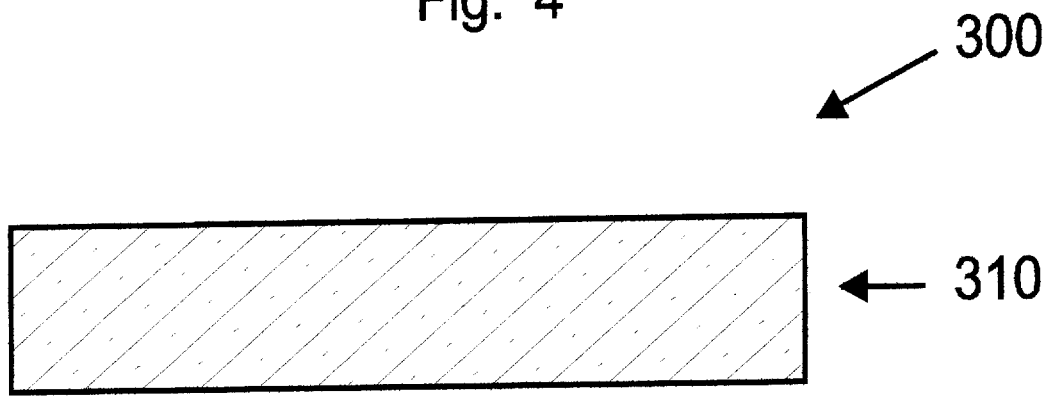
FIG. 4 is a cross-sectional view of a top coat to floor application of the invention.

Applications of using the novel preparation method are shown in FIGS. 3 and 4. For a 10×10' floor both a base coat and a top coat are prepared. For the base coat, approximately 400 pounds rubber(buffing) and approximately 50 pounds of binder are used for an 8 to 1 ratio. For the top coat, approximately 200 pounds dyed rubber and approximately 40 pounds of binder are used for a 5 to 1 ratio. FIG. 3 shows a cross-sectional side view of floor base portion 220 for shock resistance and a top coat 210 layer for color and wear. Referring to FIG. 3, top coat layer can be approximately ½ inch thick and bottom base layer 220 can be approximately 1 and ½ inches thick.

FIG. 4 shows a cross-sectional side view of floor space using only a top coat 310. Such a floor can be used for sidewalks, running tracks, pool decks and the like. Top coat 310 can be approximately ½ inch thick and be composed of approximately 200 pounds of dyed rubber with 40 pounds of binder (a 5 to 1 ratio) to cover a 10 foot by 10 foot floor.

In the application of FIG. 4, a mixture totalling approximately 600 pounds would need approximately 10 gallons of additional water for curing. Alternatively, no water would be needed if humidity in the air or rain is present.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A method of mixing products for production of a shock absorbent floor comprising the steps of:
    (a) drying rubber to substantially remove moisture;
    (b) mixing the dried rubber with liquid urethane;
    (b) mixing the dried rubber with a binder material a mixer;
    (c) vacuum removing ambient air and moisture from the container; and
    (d) sealing the container; and
    (e) applying contents of the container to a hardened floor surface,wherein no mixing process is required.

2. The method of claim 1, wherein the rubber is chosen from at least one of:
    rubber granulars, rubber buffings, virgin dyed rubber and virgin black rubber.

3. The method of claim 1, wherein the step of drying includes:
    heating the rubber to over approximately 212 F.

4. The method of claim 1, wherein the container includes:
    a bucket with a sealable lid.

5. The method of claim 1, wherein the container includes:
    a sealable foil bag.

6. A method of applying a ready made mixture to a hard floor surface to form a shock absorbent resilient floor, comprising the steps of:
    (a) pouring:—one of two coat layers of a pre-mixture of rubber and a binder product onto a stable floor surface;
    (b) levelling the poured mixture to a selected depth; and
    (c) curing the levelled mixture, wherein no other materials and components are used to form a shock absorbent resilient floor.

7. The method of applying the ready made mixture of claim 6, wherein step(c) of curing includes at least one of:
    water, humidity and rain.

8. The method of applying the ready made mixture of claim 6, wherein the top coat layer has a 5 to 1 rubber to binder ratio.

9. The method of applying the ready made mixture of claim 8, wherein the top coat layer includes: premixed rubber and urethane binder.

10. The method of applying the ready made mixture of claim 9, wherein the selected depth of the top coat is approximately ½ inch thick.

11. The method of applying the ready made mixture of claim 6, wherein the two coat layers of rubber and the binder product include:
    a top coat having a 5 to 1 rubber to binder ratio; and
    a bottom layer having an 8 to 1 rubber to binder ratio.

12. The method of applying the ready made mixture of claim 11, wherein the top coat includes:
    dyed rubber and urethan binder; and the bottom layer includes:
    buffing rubber and urethane binder.

13. The method of applying the ready made mixture of claim 12, wherein the selected depth includes:
    the top coat being approximately ½ inch thick;
    the bottom layer being approximately and ½ inch thick.

* * * * *